US012304169B2

(12) United States Patent
Gunnar et al.

(10) Patent No.: US 12,304,169 B2
(45) Date of Patent: May 20, 2025

(54) FOLDING WEDGE DEVICE FOR A BAG PACKAGING MACHINE

(71) Applicant: SN Maschinenbau GmbH, Wipperfürth (DE)

(72) Inventors: Flosbach Gunnar, Wipperfürth (DE); Oliver Clever, Lohmar (DE); Jürgen Beinghaus, Wipperfürth (DE)

(73) Assignee: SN Maschinenbau GmbH, Wipperfürth (DE)

( * ) Notice: Subject to any disclaimer, the term of this patent is extended or adjusted under 35 U.S.C. 154(b) by 99 days.

(21) Appl. No.: 17/810,387

(22) Filed: Jul. 1, 2022

(65) Prior Publication Data

US 2023/0043975 A1 Feb. 9, 2023

(30) Foreign Application Priority Data

Aug. 3, 2021 (EP) .................................... 21189416

(51) Int. Cl.
*B31B 70/26* (2017.01)
*B31B 155/00* (2017.01)

(52) U.S. Cl.
CPC .......... *B31B 70/28* (2017.08); *B31B 2155/00* (2017.08)

(58) Field of Classification Search
CPC ..... B31B 70/28; B31B 2155/00; B31B 70/26; B31B 70/18; B31B 2155/001; B31B 2155/0012; B31B 2155/0014
USPC .......................................................... 493/250
See application file for complete search history.

(56) References Cited

U.S. PATENT DOCUMENTS 3,111,310 A * 11/1963 Dutro ..................... B65H 45/09 493/439
3,165,310 A * 1/1965 Peterson ................. B31B 70/36 270/41
4,285,686 A * 8/1981 Ambler ................ B65H 45/223 493/476
5,016,863 A * 5/1991 Birkmair .............. B65H 45/226 270/41
5,137,505 A * 8/1992 Ishii ........................ B31B 70/00 493/476
5,902,222 A * 5/1999 Wessman ............. B65H 45/226 270/41

(Continued)

FOREIGN PATENT DOCUMENTS

CH 377183 A 4/1964
GB 899726 A 6/1962

*Primary Examiner* — Sameh Tawfik
(74) *Attorney, Agent, or Firm* — Harness, Dickey & Pierce, P.L.C.

(57) ABSTRACT

A folding wedge device for a bag packaging machine for continuously adjusting a bottom fold of a bag, comprising: a feed area for continuously feeding a flat packaging foil; a discharge area opposite the feed area for discharging the packaging foil folded centrally by means of the folding wedge device, a folding wedge with two folding wedge strips converging towards one another in a wedge shape from the feed area to the discharge area for deflecting the packaging foil; a counter tip arranged behind the folding wedge strips in the conveying direction of the packaging foil for inserting the bottom fold between the packaging foil sections folded centrally on top of one another, the folding wedge strips having end sections pointing towards the counter tip; wherein a lateral distance between the end sections of the folding wedge strips is infinitely adjustable.

15 Claims, 5 Drawing Sheets

(56) References Cited

U.S. PATENT DOCUMENTS

| | | | | |
|---|---|---|---|---|
| 6,712,749 | B1 * | 3/2004 | Michalik | B65H 45/221<br>270/41 |
| 7,393,314 | B2 * | 7/2008 | Burger | B65H 45/221<br>493/405 |

* cited by examiner

FOLDING WEDGE DEVICE FOR A BAG PACKAGING MACHINE

CROSS-REFERENCE TO RELATED APPLICATIONS

This patent application claims priority to European Patent Application No. 21189416.7 dated Aug. 3, 2021, which is incorporated by reference herein in its entirety.

BACKGROUND OF THE INVENTION

Technical Field

The invention is based on a folding wedge device for a bag packaging machine with a feed area for continuously feeding a flat packaging foil, a discharge area opposite the feed area for discharging the packaging foil folded centrally by means of the folding wedge device, a folding wedge having two folding wedge strips which converge in a wedge shape from the feed area to the discharge area and are intended for deflecting the packaging foil, a counter tip arranged downstream of the folding wedge strips, as seen in the conveying direction of the packaging foil, for inserting a bottom fold between the packaging foil sections folded centrally on top of one another, the folding wedge strips having end sections pointing towards the counter tip. A similar folding wedge is known, for example, from CH 377183 A.

DISCUSSION

To produce a bottom fold on a packaging bag, format-dependent parts must be provided on the folding wedge in a paired manner. To change the dimensions of the bottom gusset, the size of which determines in particular the contact area of the bag, in previous solutions a format part at the tip of the folding wedge and a counter tip inserting the bottom gusset must be replaced and/or positioned accordingly.

Particularly in the case of frequent changes of bags to be produced with differently formed bottom gussets on a packaging bag machine with folding wedge, however, this exchange or repositioning of the format parts is time-consuming and labor-intensive.

It is therefore the aspect of the present invention to improve a folding wedge in such a way that the production of packaging bags with different bottom fold dimensions is simplified.

SUMMARY

Accordingly, it is provided that a lateral distance between the end sections of the folding wedge strips is infinitely adjustable. The packaging foil can be fed to the folding wedge device in a horizontal orientation via the feed area. The feed area may comprise a conveying and/or deflecting roller by means of which the foil web is directed under the folding wedge. The skilled person will recognize that the foil can also be fed in other orientations, and that it is rather the orientations of the feed in relation to the orientation after discharge that is important. In the direction of conveyance of the packaging foil, the folding wedge may have a slope, while the direction of movement of the foil web past the folding wedge may be horizontal. As the foil passes the folding wedges, the foil may first be deflected in the conveying direction at its outer edges into a vertical orientation toward the top of the folding wedge. As the folding wedge strips continue, the deflection can move continuously further towards the center of the foil. If no bottom fold is provided, when the foil web reaches the end of the folding wedge, i.e. when the foil web reaches the end sections of the folding wedge strips, the foil web is folded in the middle, in which case the end sections form a point which is arranged in the folding of the foil web. After passing the end sections of the folding wedges, the foil web leaves the folding wedge, whereby in the case that a bottom fold is provided, the distance between the end sections corresponds to the width of the packaging foil section which is provided for inserting the bottom fold. This packaging foil section stretched by the end sections can then be guided over the counter tip, which inserts the packaging foil section between the opposing vertical packaging foil sections deflected by the folding wedges, thereby creating the bottom fold. In cross-section, the packaging foil may have a W-shape after leaving the folding wedge device through the exit device. The exit device can be formed by two counter-rotating rollers or fixed guide elements, through whose formed gap the superimposed foil is guided and folded. It may be provided that the lateral distance between the folding wedge strips can be continuously adjusted. It can be provided that when adjusting the lateral distance between the folding wedge strips, the lateral distance is adjusted uniformly over the entire extension of the folding wedge strips. Alternatively, the lateral distance between the end sections can be adjusted by rotating the folding wedge strips relative to each other.

It may also be provided that the folding wedge strips are linearly movable along their main extension direction for adjusting the distance between the end sections. The folding wedge strips may be arranged in their original orientation at a predetermined angle to each other. During linear travel along the main extension direction of the folding wedge strips, they may maintain the predetermined angle with respect to each other. It may be provided that the linear travel of the folding wedge strips causes them to be moved relative to the feed section or the feed-out section. It may further be provided that the folding wedge strips are moved relative to the counter tip during linear travel. Thus, it may be provided that the distance between the end sections and/or between the folding wedge strips is increased when they are moved linearly in the direction of the feeding device. Furthermore, it can be provided that the distance between the end sections and/or the folding wedge strips is reduced when these are moved linearly in the direction of the feed-out device and/or the counter tip.

It is possible that the folding wedge device has a carrier plate on which linear guides, for example guide rails or a carriage, are mounted for adjusting the folding wedge strips. Alternatively, it is possible that the guide rails are mounted on the folding wedge strips. The linear guides can enable linear adjustment of the folding wedge strips relative to the carrier plate.

It is also conceivable that the folding wedge strips can be adjusted by motor by means of a drive, in particular a spindle drive, arranged in particular between the folding wedge strips. Alternatively, it is possible for each folding wedge strip to have a separate drive. In the embodiment of a common drive, this can have a center guide which can be moved by the drive along the conveying direction of the packaging foil. In contrast, the directions of movement of the folding wedge strips can each be at an angle to the conveying direction and parallel to the conveying plane. However, it can be provided that the folding wedge strips each have a movement component which extends along the conveying direction of the packaging foil. The directions of movement of the folding wedge strips can be mirror-symmetrical with respect to the conveying direction of the packaging foil. The center guide can in each case have lateral drivers which are set up to move the opposite folding wedge strips along their respective path of movement.

It can be provided that the folding wedge strips can be moved in the direction of the lead-out area to reduce the distance between the end sections. Due to their V-shaped or wedge-shaped alignment to each other, the distance between the end sections can be reduced when the folding wedge strips are moved in the direction of the lead-out area. Therefore, the lateral distance between the folding wedge strips can be reduced from the feed area in the direction of the feed-out area.

Accordingly, it can be provided that the folding wedge strips can be moved in the direction of the feed area to increase the distance between the end sections.

In addition, it can be provided that the counter tip has two counter tip strips converging towards each other in a wedge shape in the conveying direction of the packaging foil for inserting the bottom fold. While the foil is guided along an underside of the folding wedge and the folding wedge strips have corresponding deflection edges pointing towards the underside of the folding wedge, the packaging foil, on the other hand, is guided along the upper side of the counter tip in order to insert the bottom fold between the side walls of the bag, so that the deflection edges of the counter tip strips have corresponding deflection edges pointing towards the upper side of the counter tip.

In particular, it can be provided that the folding wedge and the counter tip are aligned with each other in such a way that the end sections of the folding wedge meet the counter tip obliquely in a contact area, preferably forming a foil gap of 0.1-2 mm, preferably 1 mm, with the latter. The contact area can be line-shaped. This may provide for the folding wedge tip to abut a surface of the counter tip. It may be provided that the counter tip ridges of the wedge-shaped counter tip have a spacing at a portion of the counter tip which corresponds to the maximum adjustable spacing of the end portions of the folding wedge ridges. It can also be provided that the mating point strips of the wedge-shaped mating point have a distance at a section of the mating point which corresponds to the minimum adjustable distance of the end sections of the folding wedge strips.

It may further be provided that the angle between the folding wedge and the counter tip is approximately between 100° and 140°, preferably between 110° and 130°.

It can be provided that the counter tip is height-adjustable, in particular motor-driven. This means that when the end sections of the folding wedge strips are adjusted, the counter tip can be tracked so that the contact area or the foil gap between the end sections of the folding wedge strips and the counter tip can always be set to a constant value, irrespective of the setting of the bottom fold dimension. Thus, when the bottom fold is increased, the distance between the end sections of the folding wedge strips can be increased and the folding wedge strips can be adjusted accordingly in the direction of the feed device. The resulting increase in the foil gap can thus be counteracted by adjusting the counter tip upwards. When setting a smaller bottom fold, this process can be carried out accordingly in reverse order. Alternatively, the counter tip can be adjusted along the conveying direction.

Thus, it can be provided that the counter tip is adjusted downward to reduce the bag fold dimension.

Accordingly, it may be provided that the counter tip is adjusted upward to increase the bag fold dimension.

It can also be provided that the folding wedge device has a control device which is set up to control the drive device of the folding wedge strips and the drive of the counter tip in such a way that, when the size of the bottom fold is set, the end sections of the folding wedge strips are each aligned with the counter tip strips in such a way that the lateral distance between the folding wedge strips essentially corresponds to the lateral distance between the counter tip strips in the contact area. At the same time, the control device can control the drives so that a constant foil gap is formed between the end sections of the folding wedge strips and the counter tip, regardless of the set bottom fold dimension.

Furthermore, it can be provided that the folding wedge has an additional, in particular motor-driven, adjustable guide strip to support the packaging foil between the end sections of the folding wedge strips. This can prevent wrinkling of the foil in this area. The guide strip can be arranged in such a way that it rests against the foil gap and helps to form it. The tracking of the foil strip when adjusting the bottom fold dimension can be oriented to the adjusted folding wedge strips so that it is aligned in the conveying direction at the height of the end sections in each case.

Provision may be made for the packaging foil to extend in front of the feed area substantially perpendicular to the packaging foil behind the feed-out area.

BRIEF DESCRIPTION OF THE DRAWINGS

Further details of the invention are explained with reference to the figures below. Thereby shows.

DETAILED DESCRIPTION OF THE PREFERRED EMBODIMENTS

Figure 1:
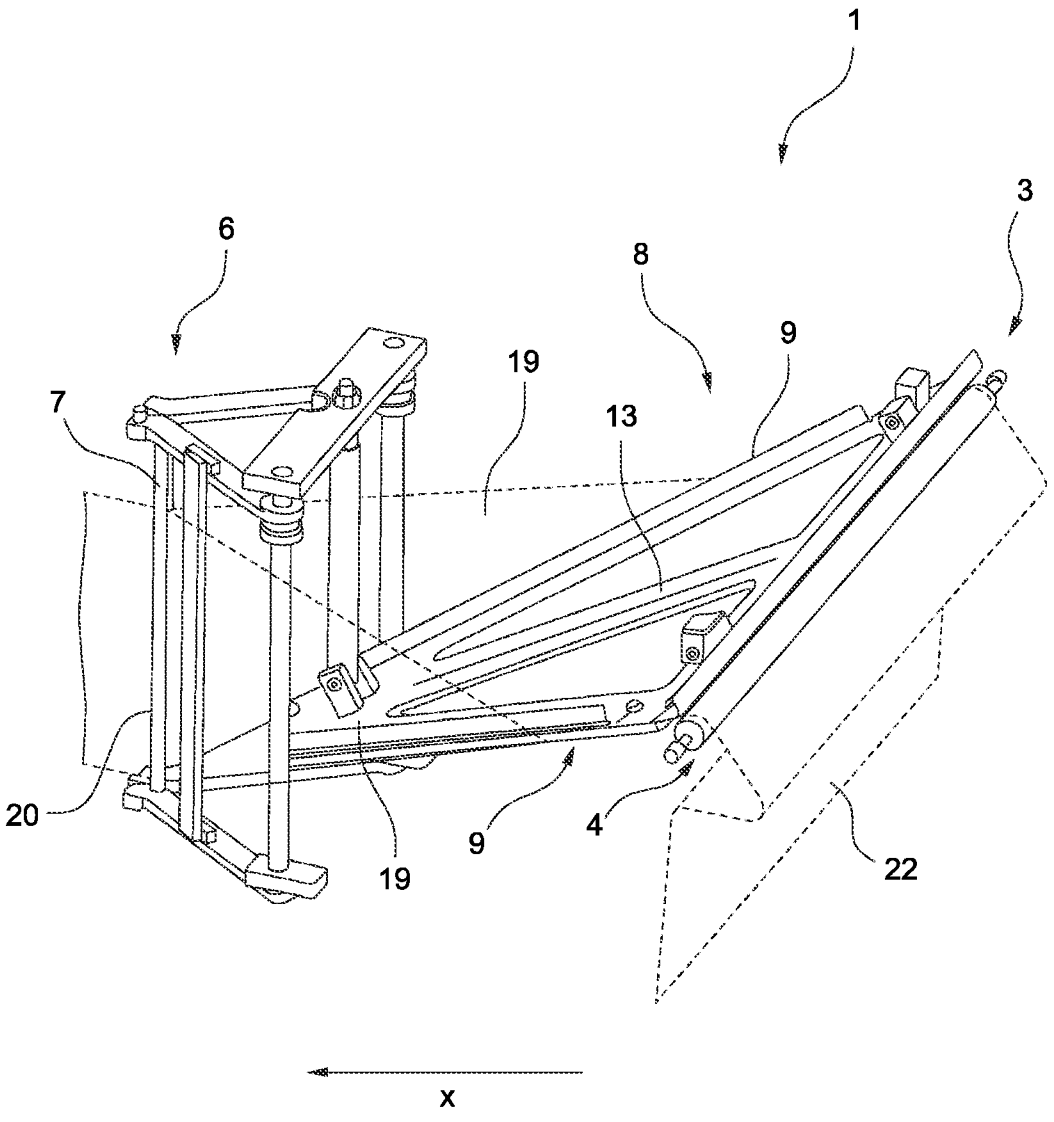
FIG. 1 a folding wedge device for producing packaging bags without a bottom fold.

The folding wedge device 1 shown in FIG. 1 serves to illustrate the process of producing a centrally folded packaging foil 22 without a bottom fold and accordingly has no elements for producing such a fold. The packaging foil 22 is fed to the folding wedge device 1 by a feed device 3 in the conveying direction X, is then guided past the folding wedge 8 and is then guided out of the folding wedge device 1 from a discharge device 6. In the region of the feed device 3, the packaging foil 22 has a plane orientation which is perpendicular to the plane orientation of the packaging foil 22 downstream of the delivery device 6. In the area of the feed device 3, the packaging foil 22 is guided flat under the folding wedge 8 by means of a feed roller 4 located upstream of the folding wedge 8. The foil 22 then passes through the folding wedge 8, which converges in the conveying direction X and at which the foil 22 is continuously deflected into a vertical orientation around folding wedge strips 9 arranged at the side edges of the folding wedge 8, starting from its outer edges in the direction of the foil center. The folding wedge 8 has a carrier plate 13 to which the folding wedge strips 9 are attached. In the embodiment shown, the foil web is folded completely in the center, i.e. in half, at the point of the wedge immediately before reaching the exit device 6. This point marks the meeting point 20 of both bag walls. The foil web 22 folded in this way, consisting of two deflected foil sections 19, is then guided through two counter-rotating guide rollers 7 forming a guide gap in order to emboss the fold and then guided out of the folding wedge device 1.

Figure 2:
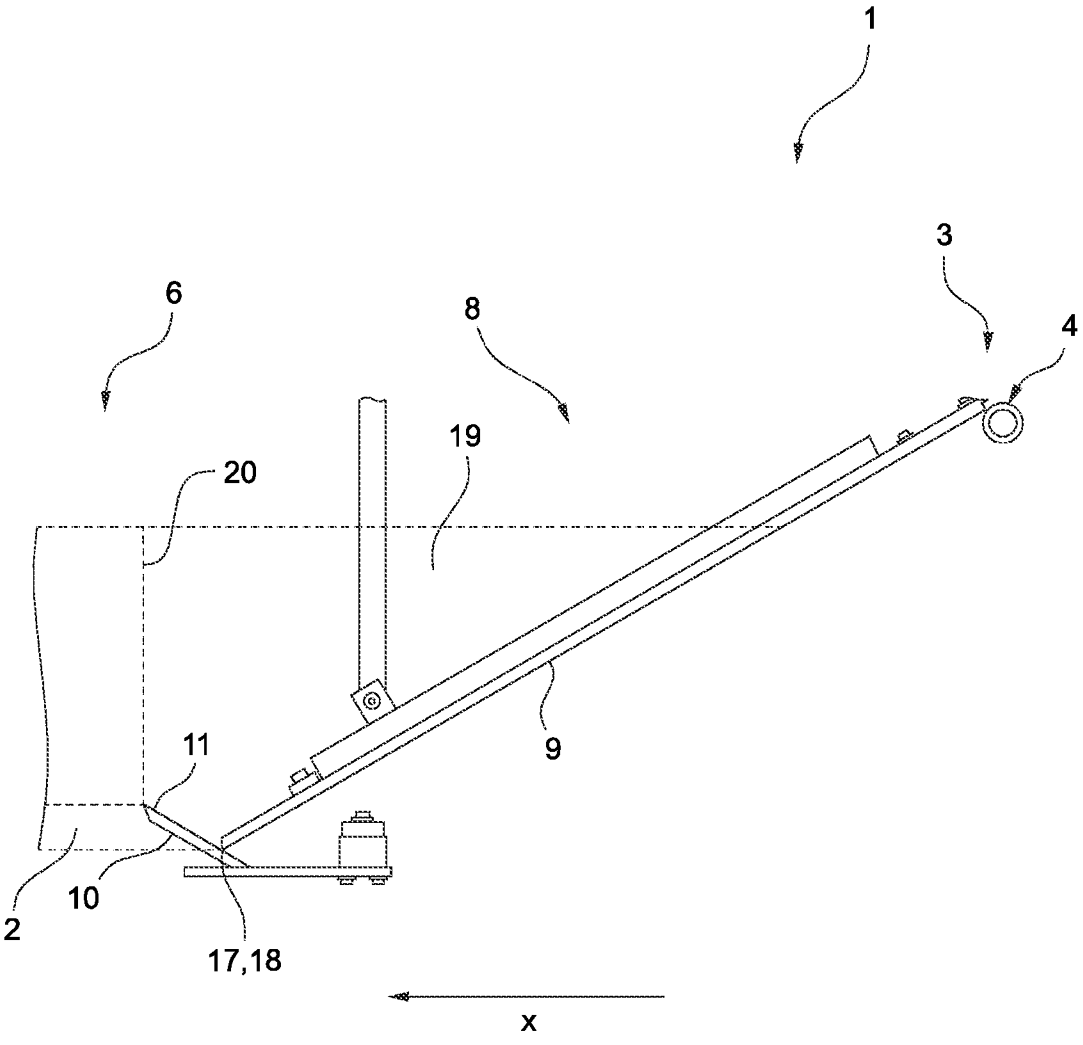
FIG. 2 a cross-sectional view of a folding wedge device with fixed wedge tip and counter tip.

The cross-sectional view of a folding wedge device 1 shown in FIG. 2 illustrates the process of producing a centrally folded foil web 22 with bottom fold 2. In the conveying direction X, from the feed area 3 around the feed roller 4, the packaging foil web 5 is guided under the folding wedge 8 and, in the course of this, deflected into a vertical orientation at the folding wedge strips 9 on both sides, so that the vertical sections move exclusively in the conveying direction X. At the lower end of the folding wedge 8, the folding wedge strips 9 have end sections 12 which are laterally spaced apart in the direction perpendicular to the image plane. When these end sections 12 are reached, the first deflection process of the foil 22 is completed, so that two lateral deflected sections 19 are opposite each other and a horizontal foil section with a width corresponding to the lateral spacing of the end sections 12 is arranged between them. The lower end of the folding wedge 8 is now adjoined in the conveying direction X by a likewise wedge-shaped counter tip 10, which is arranged at an angle $\alpha$ to the folding wedge 8. Between the end sections of the folding wedges or the lower end of the folding wedge 8 and the counter tip 10, a foil gap 18 is formed through which the foil is fed. The foil section which is horizontal in the area of the foil gap 18 is now also folded centrally in the course of the counter tip 10, likewise continuously starting from the sides of the section in the area of the foil gap 18 to the center of the foil web 22 in the area of the tip of the counter tip. However, this second deflection process takes place in the opposite direction to the first deflection process, so that the horizontal foil section is inserted as a bottom fold between the vertical foil sections 19. At point 20, i.e. immediately after leaving the counter tip, the vertical foil sections 19 meet and are then guided out of the folding wedge device 1 by the counter-rotating guide rollers 7 of the discharge section.

Figure 3:
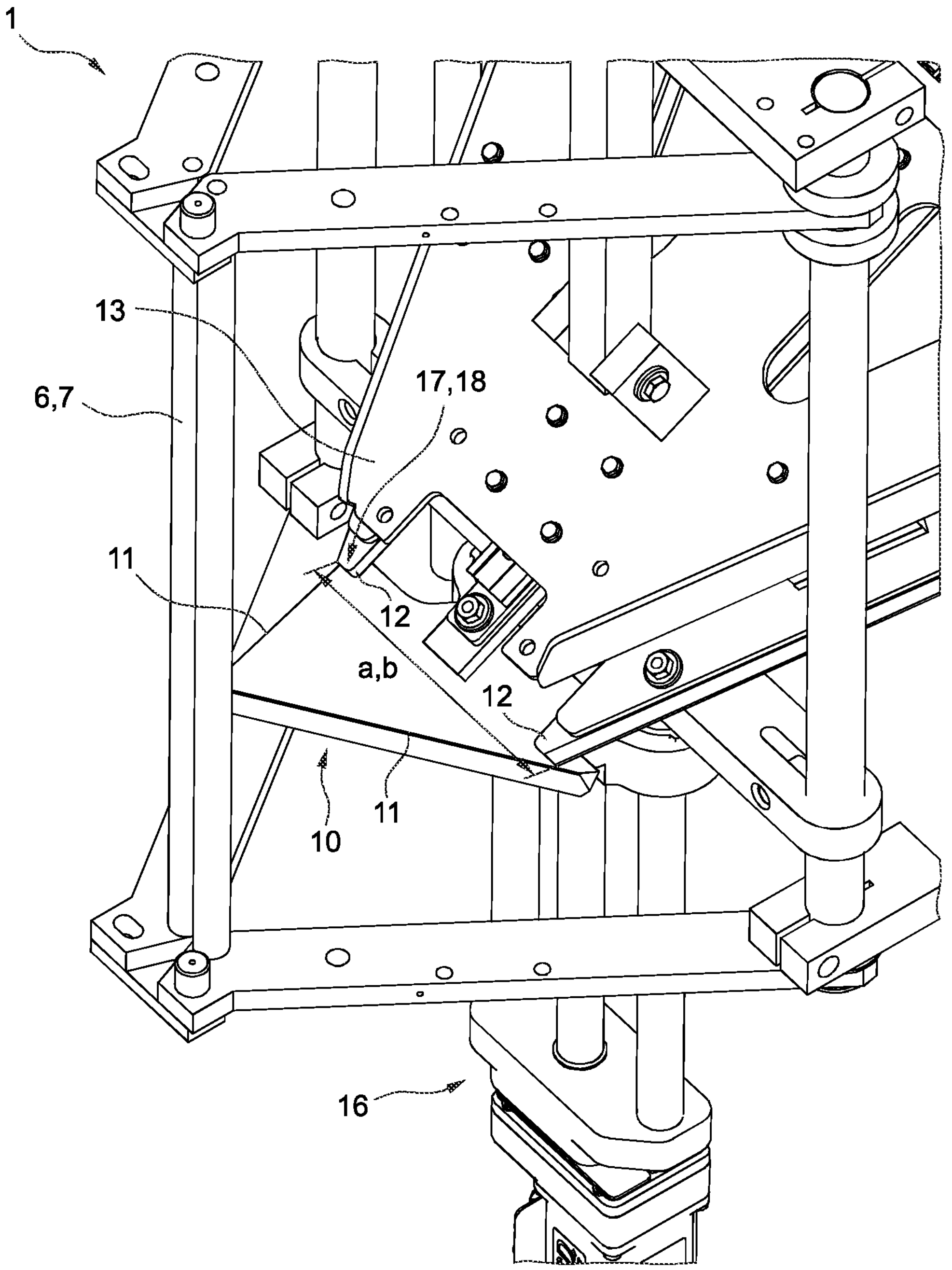
FIG. 3 a view of an embodiment of a folding wedge with adjustable wedge tip and adjustable counter tip in the state for producing a large bottom fold.

FIG. 3 shows an embodiment of the folding wedge device according to the invention with a detailed view of the area where the folding wedge strips 9 and the counter tip 10 meet. The folding wedge 8 has a carrier plate 13 on which linearly movable folding wedge strips 9 are mounted via linear guides 14. The folding wedge strips 9 are linearly adjustable along their main extension direction E along the folding wedge 8 by means of a center guide 21 adjustable by a motor-driven spindle 15. Because the folding wedge strips 9 are mounted on the folding wedge 8 at an angle to one another, the distance a between the end sections 12 of the folding wedge strips 9 can be continuously adjusted. Adjacent to the end sections, forming the foil gap 18 and at an angle $\alpha$ to the folding wedge 8, is the counter tip 10, which is wedge-shaped and has a tip which opens directly into the gap between the guide rollers 7 or guide segments. The counter tip 10, along which the foil 22 is guided along the upper side of the counter tip 10, has counter tip strips 11 corresponding to the folding wedge strips 9, along which the foil guided past is deflected. The counter tip 10 is height-adjustable by means of a spindle drive 16. In the contact area 17, i.e. in the area of the foil gap 18, between the counter tip 10 and the end sections 12 of the folding wedge strips 9, the counter tip strips 11 of the counter tip 10 have a lateral spacing b which corresponds to the lateral spacing a between the end sections 12 of the folding wedge strips 9. In the embodiment shown, the folding wedge device 1 is set to produce bags with a large bottom fold 2. On the one hand, this means that the folding wedge strips 9 are moved away from the discharge area 6 and accordingly produce a large distance a between the end sections 12. On the other hand, the counter tip 10 is adjusted upwards to compensate for the vertical adjustment component of the folding wedge strips 9. Thus, on the one hand, a constant foil gap 18 can be produced regardless of the set size of the bottom fold 2. On the other hand, the folding wedge strips 9 and the counter tip 10 can always be adjusted to each other so that the distance a corresponds to the distance b in each case.

Figure 4:
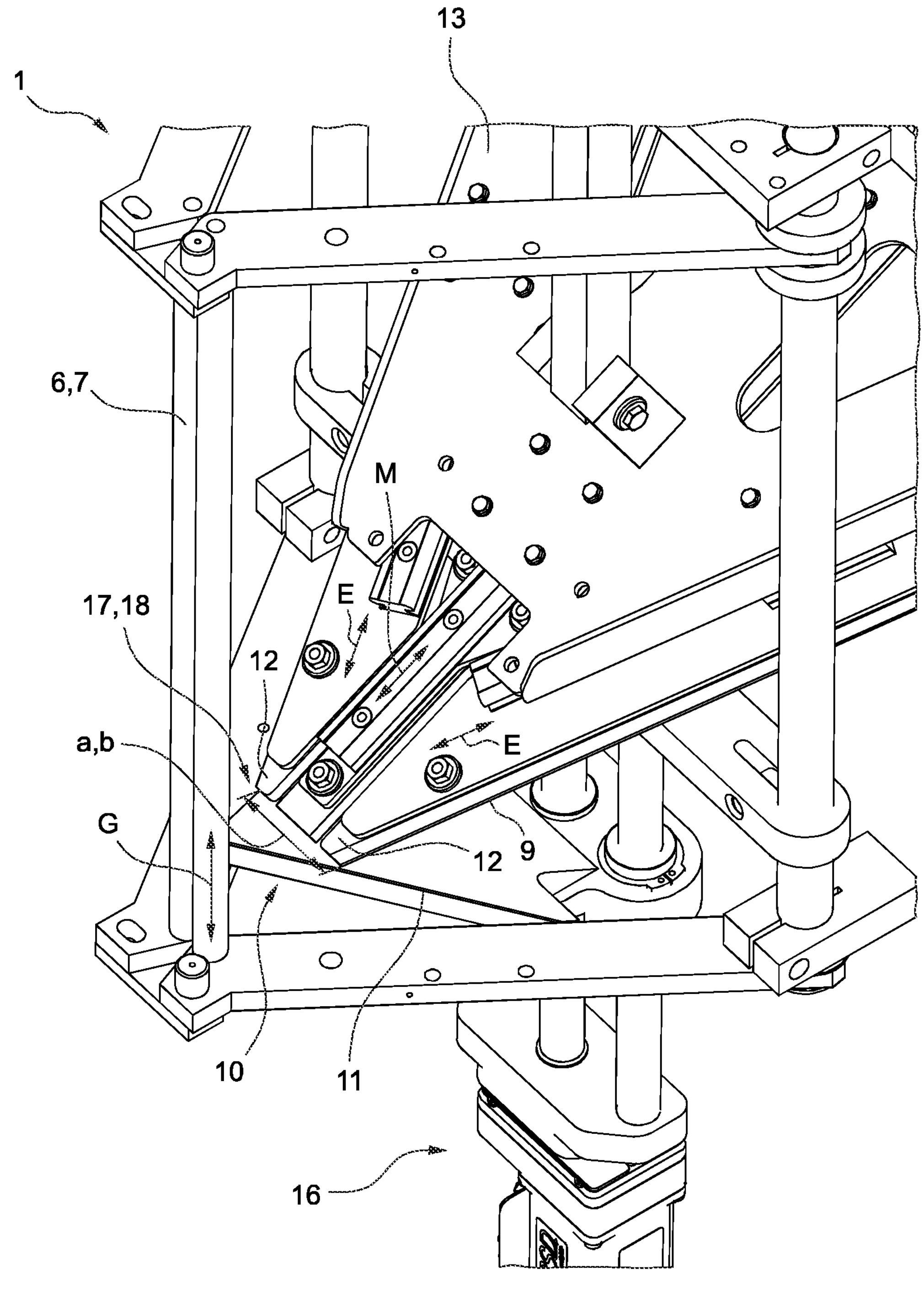
FIG. 4 a view of the embodiment of the folding wedge of FIG. 3 with adjustable wedge tip and adjustable counter tip in the state for producing a small bottom fold.

FIG. 4 shows the embodiment of the folding wedge device 1 already shown in FIG. 3 in the state for producing a small bottom fold 2. For this purpose, the folding wedge strips 9 have been moved far in the direction of the executing device 6, so that the end sections 12 have a small spacing a. In contrast, the counter tip 10 is moved far downward, so that the distance b between the counter tip strips 11 in the contact area 17 between the end sections 12 and the counter tip 10 is likewise small and corresponds to the distance a. The foil gap 18 has the same gap width as that in FIG. 3. The adjustment directions of the individual components can be seen well in FIG. 4. The counter tip 10 can be adjusted in height along the adjustment direction G. The center guide 21 moving the folding wedge strips 9 can be adjusted along an adjustment direction M along the conveying direction X. The adjustment directions E of the folding wedge strips 9 resulting from an adjustment of the center guide 21 run at an angle to each other along the folding wedge sides.

Figure 5:
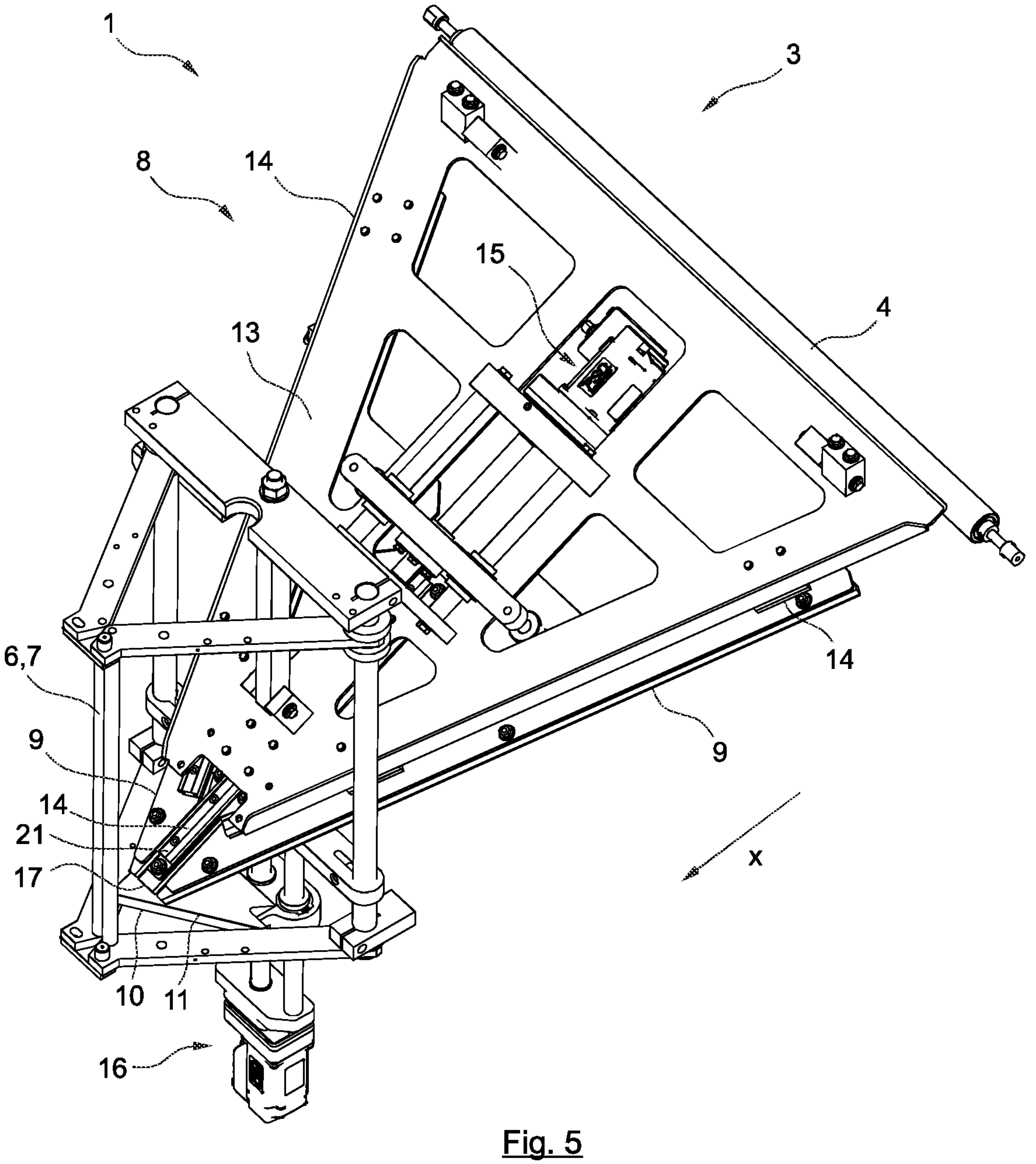
FIG. 5 a general view of an embodiment of a folding wedge device according to the invention in the state for producing a small bottom fold.

FIG. 5 shows a general view of an embodiment of the folding wedge device 1. On the feed area 3, there is a feed roller for feeding the packaging foil web 22 under the folding wedge 8 or under the folding wedge strips 9, which are each connected to a carrier plate 13 via linear guides 14 and can be continuously adjusted along the folding wedge sides. A motorized spindle drive 15 is used to adjust the center guide 21, which uses drivers to drive the folding wedge strips 9 arranged to the side of the center guide 21. At the lower end of the folding wedge strips 9, their end sections 12 point in the direction of the counter tip 10 arranged at an angle to the folding wedge 8 and together with the latter form a foil gap 18. The counter tip 10 has counter tip strips 11 for deflecting the foil section provided for the bottom fold 2. The counter tip 10 can be adjusted in height by a spindle drive 16. After leaving the counter tip, the then folded packaging foil is guided out of the folding wedge device through the discharge area 6. The counter tip 10 can be adjusted in height by a spindle drive 16.

The features of the invention disclosed in the foregoing description, in the drawings as well as in the claims may be essential to the realization of the invention both individually and in any combination.

What is claimed is:

1. A folding wedge device for a bag packaging machine for continuously adjusting a bottom fold dimension of a bag, comprising

- a feed area for continuously feeding a flat packaging foil web;
- a discharge area opposite the feed area for discharging the packaging foil web folded centrally by means of the folding wedge device,
- a folding wedge with two folding wedge strips lying in a first plane and converging in a wedge shape from the feed area to the discharge area for deflecting the packaging foil web;

a counter tip arranged behind the folding wedge strips in the conveying direction of the packaging foil web for inserting the bottom fold between the packaging foil sections folded centrally on top of one another, the folding wedge strips having end sections pointing towards the counter tip, the counter tip lying in a second plane different than the first plane and angled upwardly from the first plane of the folding wedge strips; and wherein a lateral distance (a) between the end sections of the folding wedge strips is adjustable by moving the folding wedge strips towards and away from the counter tip.

2. The folding wedge device according to claim 1, wherein the folding wedge strips are linearly movable along their main extension direction for adjusting the distance between the end sections.

3. The folding wedge device according to claim 1, wherein the folding wedge device has a carrier plate on which linear guides for adjusting the folding wedge strips are mounted.

4. The folding wedge device according to claim 1, wherein the folding wedge strips are motor-adjustable by means of at least one drive, preferably a spindle drive, preferably arranged between the folding wedge strips.

5. The folding wedge device according to claim 1, wherein the folding wedge strips moved in the direction of the discharge area to reduce the distance between the end sections.

6. The folding wedge device according to claim 1, wherein the folding wedge strips moved in the direction of the feed area to increase the distance between the end sections.

7. The folding wedge device according to claim 1, wherein the counter tip has two counter tip strips, which converge in a wedge shape in the conveying direction of the packaging foil web, for inserting the bottom fold.

8. The folding wedge device according to claim 1, wherein the folding wedge and the counter tip aligned with respect to one another in such a way that the end sections of the folding wedge meet the counter tip obliquely in a contact area, forming a foil gap, wherein the foil gap preferably has a gap width of approximately 0.1-2 mm, preferably 1 mm.

9. The folding wedge device according to claim 1, wherein the angle (a) between the folding wedge and the counter tip is approximately between 100° and 140°, preferably between 110° and 130°.

10. The folding wedge device according to claim 1, wherein the counter tip is height-adjustable, in particular motor-driven.

11. The folding wedge device according to claim 10, wherein the folding wedge device has a control device which is adapted to control the drive device of the folding wedge strips and the drive of the counter tip in such a way that, when the size of the bottom fold is set, the end sections of the folding wedge strips are each aligned with the counter tip strips in such a way that the lateral distance between the folding-wedge strips essentially corresponds to the lateral distance between the counter tip strips in the contact area.

12. The folding wedge device according to claim 1, wherein the counter tip is adjustable downwards for reducing the bag fold dimension.

13. The folding wedge device according to claim 1, wherein the counter tip is adjustable upwards for increasing the bag fold dimension.

14. The folding wedge device according to claim 1, wherein the folding wedge has an additional motor-adjustable guide strip for supporting the packaging foil web between the end sections of the folding wedge strips.

15. The folding wedge device according to claim 1, wherein the packaging foil web in front of the feed area extends substantially perpendicular to the packaging foil web behind the discharge area.

* * * * *